United States Patent [19]

Schulte

[11] Patent Number: 5,171,431

[45] Date of Patent: Dec. 15, 1992

[54] ELECTRONIC LIME CONTROLLER WITH CONTROLS RESPONSIVE TO FLOW RATES AND WATER HARDNESS

[76] Inventor: Hartmut Schulte, Ringstrasse 45, D-6475 Glauburg, Fed. Rep. of Germany

[21] Appl. No.: 708,184

[22] Filed: May 31, 1991

[51] Int. Cl.⁵ .................... C02F 1/48; B01D 17/12
[52] U.S. Cl. ....................... 210/94; 210/96.1; 210/97; 210/143; 210/222; 210/243; 361/143
[58] Field of Search ............ 210/85, 87, 94, 96.1, 210/97, 143, 222, 243, 745, 748, 695; 422/22; 204/155; 361/143, 159

[56] References Cited

U.S. PATENT DOCUMENTS

| | | | |
|---|---|---|---|
| 4,336,223 | 6/1982 | Hillman | 210/746 |
| 4,458,153 | 7/1984 | Wesley | 422/22 |
| 4,865,748 | 9/1989 | Morse | 210/243 |
| 4,938,174 | 7/1990 | Bennett | 210/746 |
| 4,938,875 | 7/1990 | Niessen | 210/222 |
| 5,074,998 | 12/1991 | De Batt Doelman | 210/222 |

FOREIGN PATENT DOCUMENTS

| | | | |
|---|---|---|---|
| 357102 | 3/1990 | European Pat. Off. | 210/695 |
| 233492 | 3/1986 | Fed. Rep. of Germany | 210/695 |

Primary Examiner—Robert A. Dawson
Assistant Examiner—Joseph Drodge
Attorney, Agent, or Firm—Price, Heneveld, Cooper, DeWitt & Litton

[57] ABSTRACT

An electronic lime controller for controlling lime adjusts for water hardness and the water flow rate in a water system. The controller includes a control for adjusting the frequency of a controller output signal which creates a magnetic field via first and second coils wrapped around a pipe to adjust the controller for changing water flow rates. The controller also includes a control for adjusting the amplitude of the controller output signal based on water hardness rates which generates the magnetic field via the first and second coils.

19 Claims, 1 Drawing Sheet

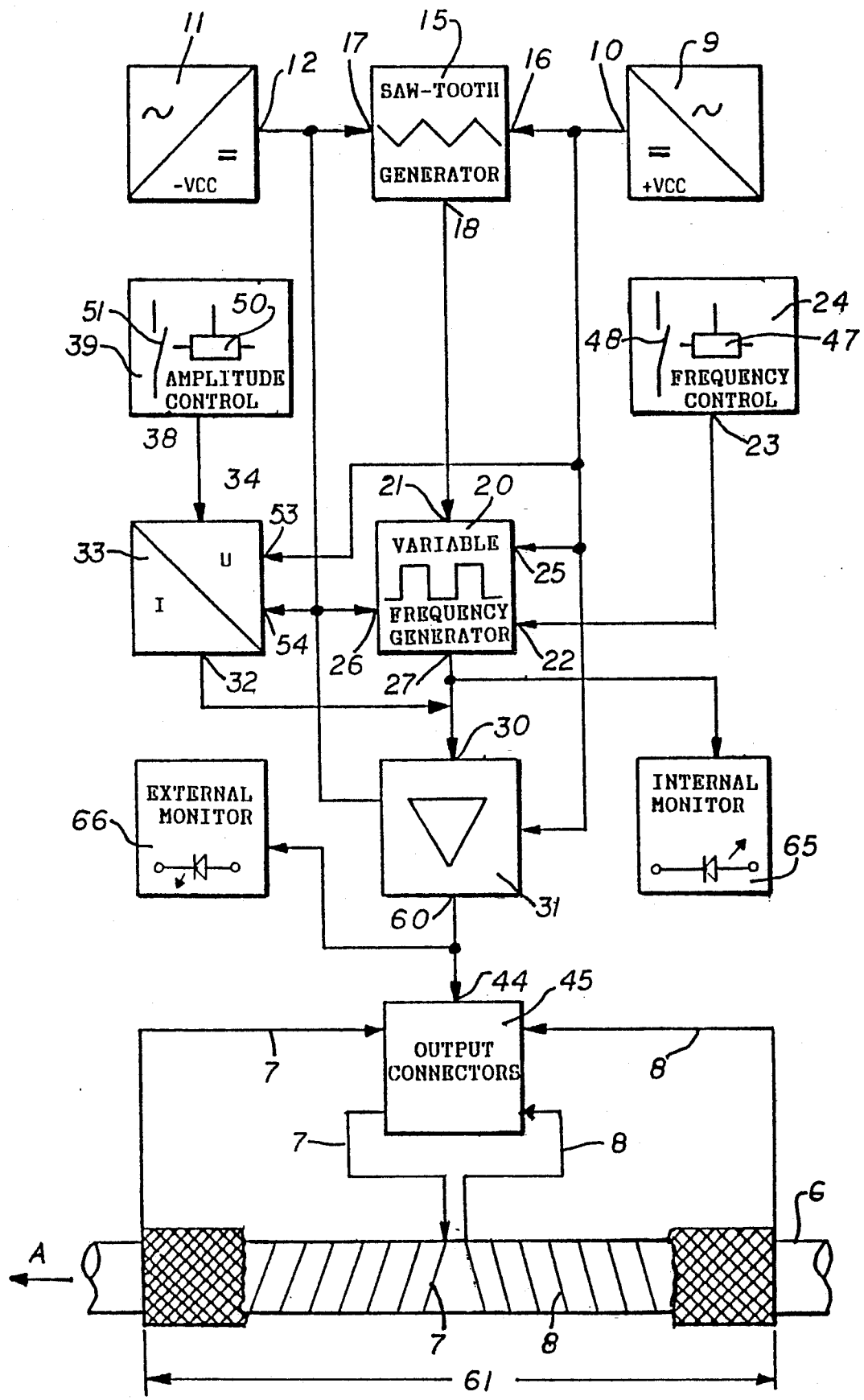

ELECTRONIC LIME CONTROLLER WITH CONTROLS RESPONSIVE TO FLOW RATES AND WATER HARDNESS

BACKGROUND OF THE INVENTION

The invention pertains to water softeners, and more particularly to an operational process for an electronically controlled lime controller.

Drinking water primarily comes from two sources. Drinking water is obtained from bodies of water on the earth's surface. Drinking water is also obtained from subterranean wells which gather water after it is filtered through the top layers of the earth. After water ($H_2O$) passes through the top layers of the earth's surface, it contains carbon dioxide, a carbon acid. In the lower strata of the earth, the carbon acid enriched water dissolves lime ($CaCO_3$) out of subterranean rock and converts it to calcium-hydrogen carbonate. The resulting calcium-hydrogen carbonate is the source of lime deposits and crustifications (scaling) which form in water systems.

Regardless of the source of drinking water, water typically contains carbon dioxide ($CO_2$) and earth alkalines, such as calcium and magnesium. The total hardness of the water is the sum of the calcium-hydrogen carbonate, magnesium-hydrogen carbonate and the non-carbonate starch which includes a calcium and magnesium component solution. Consequently, the water "hardness" is dependent upon the amount of lime in the water.

There are several methods of preventing limestone deposit formation (i.e., crustification or scaling) in water systems. In one method, ion exchanging mechanisms are used to remove the calcium ions $Ca_2+$ and the calcium-hydrogen carbonate from the water by combining the calcium ions and calcium-hydrogen carbonate with sodium ions from sodium chloride (NaCl). Another method uses phosphate chemicals as an additive mechanism to prevent the formation of crust deposits. The lime is either contained by the added chemicals or it forms a sediment which is flushed by the water moving through the system. A third method for preventing the formation of lime deposits uses an electronic lime controller which generates an electromagnetic field to change the separation characteristics of calcium and carbonate before it enters the water system. The process is purely physical as it uses no chemical additives.

Electronic lime controllers output electronic impulses having a negative current which generates the electromagnetic field that changes the calcium-hydrogen carbonate into a non-adhesive calcium carbonate, which is a powder, and carbonic acid. As the water passes through the electromagnetic field, amorphous particles develop and stand in equilibrium with the carbonic acid contained in the water. Because particles in the lime powder are stable over an extended period of time, they do not form a hard crusted layer (scaling). The lime particles are flushed out of the system by the action of running water in the system. At high temperatures, the particles remain unchanged, and existing crustifications slowly erode as small amounts of carbon dioxide are released into the running water.

In September of 1986, the Federal Environmental Protection Agency issued a release concerning side effects of chemical water softening methods. Electronic lime controllers are particularly advantageous as the electronic controller uses a physical process to treat the water. Consequently, the undesirable changes that take place when chemicals are added to water are not present in this process. Electronic lime controllers are particularly advantageous as no chemical additives are placed in the water. However, known electronic lime controllers are not adjustable upon installation for treating water passing through the system at different flow rates. Furthermore, known electronic lime controllers are not adjustable to compensate for changes in the hardness of the water entering the water system.

SUMMARY OF THE INVENTION

The present invention provides an adjustable electronic lime controller which generates an electromagnetic field in a water supply pipe. The lime controller includes a controller for adjusting the frequency of a variable frequency signal generated by a variable frequency generator. A driver is connected to receive the variable frequency signal generated by the variable frequency generator and a signal output by another controller. The driver outputs a signal which is applied to a conductor located proximate to said water supply pipe for generating an electromagnetic field which controls lime in the water system. Accordingly, an electronic lime controller is provided which is adjustable for controlling lime in a water system having changing water flow rates and water hardness.

These and other objects, advantages and features will become apparent upon review of the following specification in conjunction with the drawings.

BRIEF DESCRIPTION OF THE FIGURE

The FIGURE is a schematic circuit block diagram of a lime monitor according to the present invention.

DESCRIPTION OF THE PREFERRED EMBODIMENT

Referring to the drawing, and the illustrative embodiment depicted therein, a lime controller 5 according to the invention is illustrated for a water supply system. The water supply system includes a supply pipe 6 through which water flows in the direction indicated by arrow A to enter a building. The controller 5 interfaces with the water supply through a pair of conductors 7 and 8 wrapped around pipe 6. Each conductor is wrapped around the pipe such that the current passing through each of these conductors creates a magnetic field in the pipe having the same field orientation. Pipe 6 has a maximum water flow rate therethrough depending on the size of the pipe and the water pressure supplied to the pipe.

Lime controller 5 generates an output current applied to conductors 7 and 8 which creates a magnetic field in pipe 6. Monitor 5 includes an AC to DC converter 9 which generates a positive DC supply potential VCC at output 10 from an AC power supply, such as a 110 volt AC wall outlet. An AC to DC converter 11 is connected to the AC power supply to convert the AC signal to a negative DC potential −VCC output at terminal 12. AC to DC converters are well-known and, accordingly, are not described in greater detail herein. A constant frequency saw-tooth generator 15 has an input 16 connected to output 10 of converter 9 and an input 17 connected to output 12 of converter 11. The saw-tooth generator provides a fixed frequency saw-tooth wave at output 18 in response to the DC power supplied from AC to DC converters 9, 11. Saw-tooth generators are well-known which generate fixed frequency saw-tooth signals and accordingly the saw-tooth generator is not described in greater detail herein.

A variable frequency sweep generator 20 has an input 21 connected to output 18 of saw-tooth generator 15, a frequency control input 22 connected to an output 23 of a frequency control 24, a supply input 25 connected to output 10 of AC to DC converter 9, and a supply input 26 connected to output 12 of AC to DC converter 11. Sweep generator 20 produces a signal output at an output 27 that is coupled to an input 30 of an output driver 31. Output driver 31 is a low-frequency power amplifier that produces an output signal at an output 60 that is a function of the signal produced by sweep generator 20 and the output 32 of a voltage-to-current converter 33 that is also connected with input 30. An input 34 of voltage-to-current converter 33 is connected to output 38 of an amplitude control 39. Voltage-to-current converters are well-known and may, for example, be provided by an amplifier and a bipolar transistor as is well known. Accordingly, the voltage-to-current converter is not described in greater detail herein. Output driver 31 combines the signal output from converter 33 and the signal output from variable frequency generator 20 and outputs a signal on output 44 which is coupled to distributor 45. Distributor 45 is provided by connectors which interconnect with connectors on the ends of conductors 7 and 8.

The saw-tooth wave generated by saw-tooth signal generator 15 constantly changes the frequency of the signal generated by generator 20, and thus twice within each cycle of the saw-tooth generator a frequency is repeated. Signal generator 20 is thus a sweep generator wherein the frequency of the output signal repeatedly sweeps over a frequency range. Sweep generator 20 may be provided by a pulse position modulator responsive to the saw-tooth signal output by generator 15 for generating a changing frequency signal, or a voltage controlled oscillator. Of course, digital sweep generators are well-known which include an input for adjusting the frequency of the output signal.

Frequency control 24 includes a variable potentiometer 47 for supplying a variable DC signal in order to control the frequency of the output signal generated in source 20. Frequency control 24 includes a switch 48 that is a course adjustment to select either a first frequency range or a second frequency range for the signals produced by generator 20. Potentiometer 47 provides a fine adjustment within the range selected by switch 48. The frequency control is used to adjust the frequency of the signal output from sweep generator 20 according to the maximum expected water velocity through pipe 6. The maximum velocity is determined by the water pressure in the water supply system and the diameter of pipe 6. In the illustrated embodiment, frequency control 24 is adjusted to set the maximum frequency output by the sweep generator 20 to a frequency between 600 Hz and 8,000 Hz.

Amplitude control 39 includes a potentiometer 50 and a switch 51 for generating a degree of hardness control output potential on output 38, which is applied to voltage-to-current converter 33. Switch 51 is used to select either a first or a second range of output signal levels and potentiometer 50 is used to adjust the voltage level within the first or second ranges. Voltage-to-current converter 33 produces a current on output 32 that is proportional to the control voltage produced by amplitude control 39. Driver amplifier 31 is responsive to the current signal produced by converter 33 and the variable frequency signal produced by sweep generator 20 in order to generate a variable frequency current signal that is applied to output connectors 45.

Each end of conductors 7 and 8 includes a connector which interconnects with respective connectors in output connector 27. Conductors 7 and 8 are wound around pipe 6 over a measuring distance 61, which may for example be 16 inches. The measuring distance is the length of pipe 6 around which the two conductors are wrapped. The conductors are wrapped around pipe 6 in such a manner the current passing through the conductors create magnetic fields having the same polarity.

An internal monitor 65 and an external monitor 66 are connected in the circuit to provide visual indications of the system operational state and to alert the user of problems when they occur. Thus, an internal monitor 65 is connected to output 27 of sweep generator 20 and includes an LED (e.g., a green LED) which is selectively activated when the generator is operating. The circuit monitors the signal output from generator 20. The external monitor 66 is connected to the output of driver amplifier 31 to monitor the signal applied to conductors 7 and 8. When no current is passing through conductors 7 and 8, an LED (e.g., a red LED) illuminates to visually indicate that a problem exists.

In operation, saw-tooth generator 15 produces a constant frequency signal which is applied to input 21 of sweep generator 20. Sweep generator 20 is responsive to the saw-tooth wave and to frequency control 24 for generating a signal having a frequency sweeping between 0 Hz and the maximum frequency set by the frequency control 24. In a preferred embodiment of the invention, the desired frequency is generated by widening and narrowing of the individual segments of the signal output by saw-tooth generator 15. Sweep generator 20, under the control of frequency control 24, generates an output signal which varies for example, between 0–6 KHz, which output signal is applied to driver 30. Amplitude control 39 outputs a potential which is converted to a current signal in voltage-to-current converter 33, and the current signal is provided, along with the output of sweep generator 20, as inputs to amplifier driver 31. The output signal from amplifier driver 31 flows through both of conductors 7 and 8 and is applied over the measuring distance 61.

The adjustable frequency and amplitude of the driver output signal allows the lime controller to compensate for changing water hardness and water flow rates. A user determines the maximum flow rate and the hardness of water entering the water system through pipe 6, and sets the frequency control 24 to a position determined by the maximum expected flow rate. The user also sets the amplitude control 39 to a position determined by the hardness of water flowing through pipe 6. The frequency control 24 thus acts as a water flow rate controller, and the amplitude control 39 acts as a water hardness controller.

It may thus be seen that a lime controller for controlling water hardness is set forth which advantageously provides an optimal water treatment system for eliminating scaling in water without chemicals being added thereto. Additionally, a versatile system is set forth which may easily be adjusted for changing water hardness and water flow rates. The system alters the separation characteristics of minerals in water through a physical process, and the particles formed precipitate into solution and remain in suspended equilibrium in the water with the carbonic acid contained in the water. The lime controller thus influences the lime molecules that are in the water, and the resulting water resists crustification that can develop when water is heated in hot water heaters, boilers, dishwashers, washers, coffee machines, pipe lines, and mountings, as well as other elements. Additionally, the water treated by the lime controller is stable, and water flowing through the system flushes the lime out without detrimentally effecting the water quality.

The above description is considered that of the preferred embodiment only, and thus modifications of the invention will occur to those who make or use the invention. Thus, for example, an automatic regulation system may be provided for the lime controller which continuously monitors the water hardness, as well as the momentary flow rate, and automatically adjusts the frequency and amplitude of the output signal. The output magnitude would then constitute a constant value which automatically guides the value adjustments of each component. Therefore, it is understood that the embodiment shown in the drawing and described above is merely for illustrative purposes and is not intended to limit the scope of the invention which is defined by the following claims as interpreted according to the principles of patent law.

The embodiments of the invention in which an exclusive property or privilege is claimed are defined as follows.

1. An electronic lime controller for a water system comprising:
   a first controller having an output and including a potentiometer, said first controller outputting a control signal at said first controller output, the level of said first controller control signal controlled by said potentiometer;
   a second controller having an output, said second controller outputting a control signal at said second controller output;
   a variable frequency signal source having an output, said variable frequency signal source outputting an output signal having a variable frequency at said output, said variable frequency signal source including an input coupled to said first controller output, said variable frequency signal source responsive to said first controller control signal for generating said output signal whereby the frequency of said output signal generated by said signal source is adjustable for different water flow rates;
   an output driver having an input coupled to said output of said variable frequency signal source to receive said output signal of said variable frequency signal source and coupled to said output of said second controller, wherein said output driver generates a driver output signal as a function of said output signal of said variable frequency signal source and said second controller control signal; and
   at least one output conductor coupled to said output driver and located proximate to said water system whereby said controller output signal is applied to said at least one conductor and generates an electromagnetic field through which water in said water system flows for controlling lime in said water.

2. The electronic lime controller as defined in claim 1, wherein said variable frequency signal source is responsive to the level of said first controller output signal to vary the maximum frequency generated by said variable frequency source.

3. The electronic lime controller as defined in claim 2, wherein said first controller further includes a switch, said switch adapted to select either a first range or a second range from the level of said first controller output signal, and said potentiometer used to adjust the level of said first controller output signal within said first and second ranges.

4. The electronic lime controller as defined in claim 1, wherein said at least one conductor includes two output conductors for wrapping around a water pipe in the water system.

5. The electronic lime controller as defined in claim 1, wherein the frequency of said driver output signal is controllable to be between 0 and 6 KHz.

6. The electronic lime controller as defined in claim 1, further including a visual indicator coupled to said driver which illuminates to indicate that no current is output by said driver.

7. The electronic lime controller as defined in claim 1, further including a visual indicator coupled to said driver for providing a visual indication when an output signal is generated by said variable frequency signal source.

8. An electronic lime controller for a water system comprising:
   a first controller having an output, said first controller outputting a control signal at said first controller output;
   a second controller having an output, said second controller outputting a control signal at said second controller output;
   a variable frequency signal source for producing an output signal having a variable frequency, the signal source including an input coupled to said first controller output whereby said variable frequency signal source is responsive to said first controller control signal to adjust the frequency of said output signal generated by said signal source for different water flow rates;
   an output driver coupled to said signal source to receive said output signal of said signal source and coupled to said output of said second controller to receive said second controller output signal, wherein said output driver generates a driver output signal as a function of said second controller control signal whereby a signal level of said driver output signal is adjustable for different water hardness levels;
   at least one output conductor coupled to said output driver and located proximate to said water system whereby said controller output signal is applied to said at least one conductor and generates an electromagnetic field through which water in said water system flows for controlling lime in said water; and
   a constant frequency signal source coupled to said variable frequency signal source, said constant frequency signal source generating a constant frequency output signal which is applied to said variable frequency signal source.

9. The electronic lime controller as defined in claim 8, wherein said constant frequency signal generator is a saw-tooth signal source.

10. An electronic lime controller for a water system comprising:
- a first controller having an output, said first controller outputting a control signal at said output;
- a second controller having an output, said second controller outputting a control signal at said second controller output, wherein said second controller includes a potentiometer for adjusting the level of said second controller control signal;
- a variable frequency signal source for producing an output signal having a variable frequency, the signal source being coupled to the first controller output to receive said first controller output signal, said variable frequency signal source responsive to said first controller control signal whereby the frequency of said output signal generated by said signal source is adjustable for different water flow rates;
- an output driver coupled to said variable frequency signal source, said output driver receiving said output signal of said variable frequency signal source and coupled to said output of said second controller to generate a driver output signal as a function of said second controller control signal whereby said driver output signal is adjustable for different water hardness levels; and
- at least one output conductor coupled to said output driver and located proximate to said water system whereby said controller output signal is applied to said at least one conductor and generates an electromagnetic field for controlling lime in water in said water system.

11. The electronic lime controller as defined in claim 10, wherein said second controller further includes a switch for controlling said level of said second controller output signal to be within a first range or a second range, and said potentiometer adjusts the level of said first control signal within said first and second ranges.

12. An electronic lime controller for a water system comprising:
- a first controller having an output, said first controller outputting a control signal at said output;
- a second controller having an output, said second controller outputting a control signal at said second controller output;
- a variable frequency signal source having an output, said variable frequency signal source outputting a variable frequency signal at said signal source output, the signal source including an input coupled to said first controller output whereby said variable frequency signal source is responsive to said first controller control signal to adjust the frequency of said variable frequency signal generated by said variable frequency signal source for different water flow rates;
- an output driver having an input coupled to said output of said signal source to receive said variable frequency signal and coupled to said output of said second controller to receive said second controller output signal, said output driver having an output, wherein said output driver generates a driver output signal as a function of said output signal of said signal source and said second controller control signal;
- at least one output conductor coupled to said output driver and located proximate to said water system whereby said driver output signal is applied to said at least one conductor and generates an electromagnetic field for controlling lime in water in said water system; and
- a voltage-to-current converter having an input coupled to said output of said second controller and an output, said voltage-to-current converter responsive to said second controller control signal for outputting a current signal proportional to said second controller control signal, said voltage-to-current converter output coupled to said driver whereby said current signal is applied to said output driver.

13. The electronic lime controller as defined in claim 12, wherein said driver receives said variable frequency signal and said current signal and generates the controller output signal, the magnitude of said current signal varying in proportion to said second controller output signal to adjust the amplitude of said driver output signal for different water hardness levels.

14. An electronic lime controller for a water system, comprising:
- a first controller having an output and including a potentiometer, said first controller generating a first controller output signal, the level of said second controller output signal controlled by said first controller potentiometer;
- a second controller having an output and including a potentiometer, said second controller generating a second controller output signal, the level of said second controller output signal controlled by said second controller potentiometer;
- a variable frequency signal generator having an output, said variable frequency signal generator generating an output signal having a variable frequency at said signal generator output, said signal generator having an input coupled to said output of said first controller to receive said first controller output signal, whereby the frequency of said output signal of said variable frequency signal generator is a function of the magnitude of said first controller output signal;
- a driver having an input coupled to said variable frequency signal generator and coupled to said output of said second controller, said driver having an output, said driver generating a driver output signal as a function of said output signal of said variable frequency signal generator and said second controller output signal, whereby a signal level of said driver output signal is adjustable as a function of said second controller output signal for different water hardness levels of water in said water system; and
- at least one conductor coupled to said output of said driver and located proximate to said water system whereby said driver output signal is applied to said at least one conductor and generates an electromagnetic field for controlling lime in water in said water system.

15. The electronic lime controller as defined in claim 14, wherein said lime controller further includes a signal source for generating a constant frequency signal which is applied to said variable frequency signal generator.

16. The electronic lime controller as defined in claim 15, wherein said constant frequency signal generator generates a fixed frequency saw-tooth signal.

17. The electronic lime controller as defined in claim 14, wherein said first controller further includes a switch connected to said first controller potentiometer, said switch adapted to select a first range or a second range for said first controller output signal, and wherein said potentiometer is adjusted to adjust the the level of said first controller output signal within said first or second ranges.

18. The electronic lime controller as defined in claim 14, further including a voltage-to-current converter coupled to the output of said second controller, said voltage-to-current converter outputting a current signal proportional to said first controller output signal, said current signal applied to said output driver for controlling the amplitude of the driver output signal.

19. The electronic lime controller as defined in claim 14, wherein said at least one conductor includes two output conductors for wrapping around a wire pipe over a measuring distance of said pipe.

* * * * *

UNITED STATES PATENT AND TRADEMARK OFFICE
CERTIFICATE OF CORRECTION

PATENT NO. : 5,171,431
DATED : December 15, 1992
INVENTOR(S) : Hartmut Schulte

It is certified that error appears in the above-indentified patent and that said Letters Patent is hereby corrected as shown below:

column 6, claim 9, line 67: "generator" should be --source--.

Signed and Sealed this

Twenty-fourth Day of May, 1994

Attest:

BRUCE LEHMAN

Attesting Officer       Commissioner of Patents and Trademarks